United States Patent [19]
Flanagan

[11] Patent Number: 5,946,993
[45] Date of Patent: Sep. 7, 1999

[54] UNLOADING DEVICE

[76] Inventor: Mark S. Flanagan, 19 W. Tapley Rd., Lynnfield, Mass. 01904

[21] Appl. No.: 08/824,212

[22] Filed: Mar. 25, 1997

[51] Int. Cl.$^6$ ...................................................... B23B 13/10
[52] U.S. Cl. ................................ 82/124; 82/125; 82/127; 82/1.11
[58] Field of Search ............................ 82/124, 125, 126, 82/127, 1.11, 52, 71, 89, 102

[56] References Cited

U.S. PATENT DOCUMENTS

| | | |
|---|---|---|
| 2,327,916 | 8/1943 | Marlotte . |
| 3,200,679 | 8/1965 | Johnson ..................................... 82/124 |
| 3,215,287 | 11/1965 | Bodan . |
| 3,680,267 | 8/1972 | Vale et al. .............................. 51/215 H |
| 3,689,010 | 9/1972 | Alexandrov et al. . |
| 3,706,428 | 12/1972 | Carlier . |
| 3,823,628 | 7/1974 | Fortune . |
| 4,090,423 | 5/1978 | Waage . |
| 4,129,220 | 12/1978 | Peterson et al. . |
| 4,187,749 | 2/1980 | Webber ..................................... 82/125 |
| 4,406,190 | 9/1983 | Mason . |
| 4,423,993 | 1/1984 | Eaton . |
| 4,794,831 | 1/1989 | Cheng . |
| 5,343,788 | 9/1994 | Goforth . |
| 5,347,896 | 9/1994 | Jones . |
| 5,505,584 | 4/1996 | Berns ..................................... 82/125 X |
| 5,695,305 | 12/1997 | Heym ..................................... 82/127 X |

FOREIGN PATENT DOCUMENTS

| | | |
|---|---|---|
| 229265 | 9/1959 | Australia . |
| 672422 | 3/1939 | Germany . |
| 917158 | 1/1963 | United Kingdom . |

OTHER PUBLICATIONS

Nakamura Tome, "N–T Gantry Robot MON–BEI GR–210", Shaft Unloader HAI–BEI SU–20W–1000.

*Primary Examiner*—Andrea L. Pitts
*Assistant Examiner*—Henry W. H. Tsai
*Attorney, Agent, or Firm*—Fish & Richardson P.C.

[57] ABSTRACT

An unloading device for removing a workpiece from a lathe having a spindle for holding the workpiece includes an unloading apparatus for receiving the workpiece configured to couple to the spindle. A pneumatic system is coupled to the unloading apparatus whereby air flow acts on the workpiece and causes the workpiece to exit the spindle and travel to the unloading apparatus. The unloading apparatus extends into a machining chamber of the lathe to couple to the spindle. A downstream end of the unloading apparatus is configured to create a venturi effect. A workpiece receiving tray is located downstream of the unloading apparatus. After exiting the unloading apparatus the workpiece is directed against a damper. A safety door is located between the unloading apparatus and the damper. The unloading device has a footprint of a limited dimension permitting use of the unloading device with a chip conveyor.

28 Claims, 7 Drawing Sheets

UNLOADING DEVICE

BACKGROUND OF THE INVENTION

The invention relates to an unloading device, and particularly to an unloading device for automatically removing workpieces from a lathe.

The processing speed of a twin-spindle CNC lathe is hampered by the need to stop the machine and remove the finished workpiece from the lathe.

An automatic hydraulically actuated part catcher is known having a swing-in bucket that is positioned adjacent and below the lathe spindle collet for catching the workpiece when the collet is opened and removing the workpiece from the machining area. It is also known to use robotic arms to automatically remove workpieces from the lathe spindle.

SUMMARY OF THE INVENTION

The invention relates to an unloading device for removing a workpiece from a lathe having a spindle for holding the workpiece. The invention features an unloading apparatus for receiving the workpiece. The unloading apparatus is configured to couple to the spindle. A pneumatic system is coupled to the unloading apparatus whereby an air flow created by the pneumatic system acts on the workpiece when the unloading apparatus is coupled to the spindle and causes the workpiece to exit the spindle and travel to the unloading apparatus.

In particular embodiments of the invention, the unloading apparatus is configured to extend into a machining chamber of the lathe to couple to the lathe spindle. The unloading apparatus includes a first unloading member extending into the machining chamber for coupling to the spindle, and a second unloading member configured to couple to the first unloading member. The pneumatic system couples to the second unloading member whereby the air flow created by the pneumatic system acts on the workpiece when the second unloading member is coupled to the first unloading member and causes the workpiece to exit the spindle and travel to the first and second unloading members.

The unloading members include passages therethrough for receiving the workpiece. An upstream end of the second unloading member axially couples to a downstream end of the first unloading member. The upstream end of the first unloading member includes an outer taper and the downstream end of the first unloading member includes an inner taper.

The unloading apparatus includes a downstream end configured to create a venturi effect when the air flow is created at the downstream end. A coupler interacts with the downstream end of the unloading apparatus to create the venturi effect. The coupler is adjustable to control the air flow acting on the workpiece. The unloading apparatus includes a venturi block coupled to a downstream end of the second unloading member. The venturi block is configured to create the venturi effect when the air flow is created at the downstream end of the unloading apparatus.

In one illustrated embodiment, a workpiece receiving tray, for example, a v-shaped tray, is located downstream of the unloading apparatus. Two members of the tray coact to form the v-shape. One of the members is adjustable to change an included angle between the two members. A holding table receives the workpiece from the tray.

The unloading device includes a damper located downstream of the unloading apparatus against which the workpiece is directed after exiting the unloading apparatus. A safety door is located between the unloading apparatus and the damper.

According to another aspect of the invention, a method of removing a workpiece from a lathe having a spindle for holding the workpiece includes the steps of creating an air flow in an unloading apparatus coupled to the spindle. The air flow acts on the workpiece when the unloading apparatus is coupled to the spindle and causes the workpiece to exit the spindle and travel to the unloading apparatus.

According to another aspect of the invention, the unloading device has a footprint of a limited dimension permitting use of the unloading device with a chip conveyor.

Advantages of the invention include an unloading device which increases unloading speed of workpieces from a twin-spindle CNC lathe over prior known unloading devices, and is powered simply by attachment to a standard machine shop air supply and lathe control unit.

BRIEF DESCRIPTION OF THE DRAWINGS

Other objects features and advantages of the invention will be apparent from the following description taken together with the drawings in which.

DESCRIPTION OF THE PREFERRED EMBODIMENTS

Figure 1:
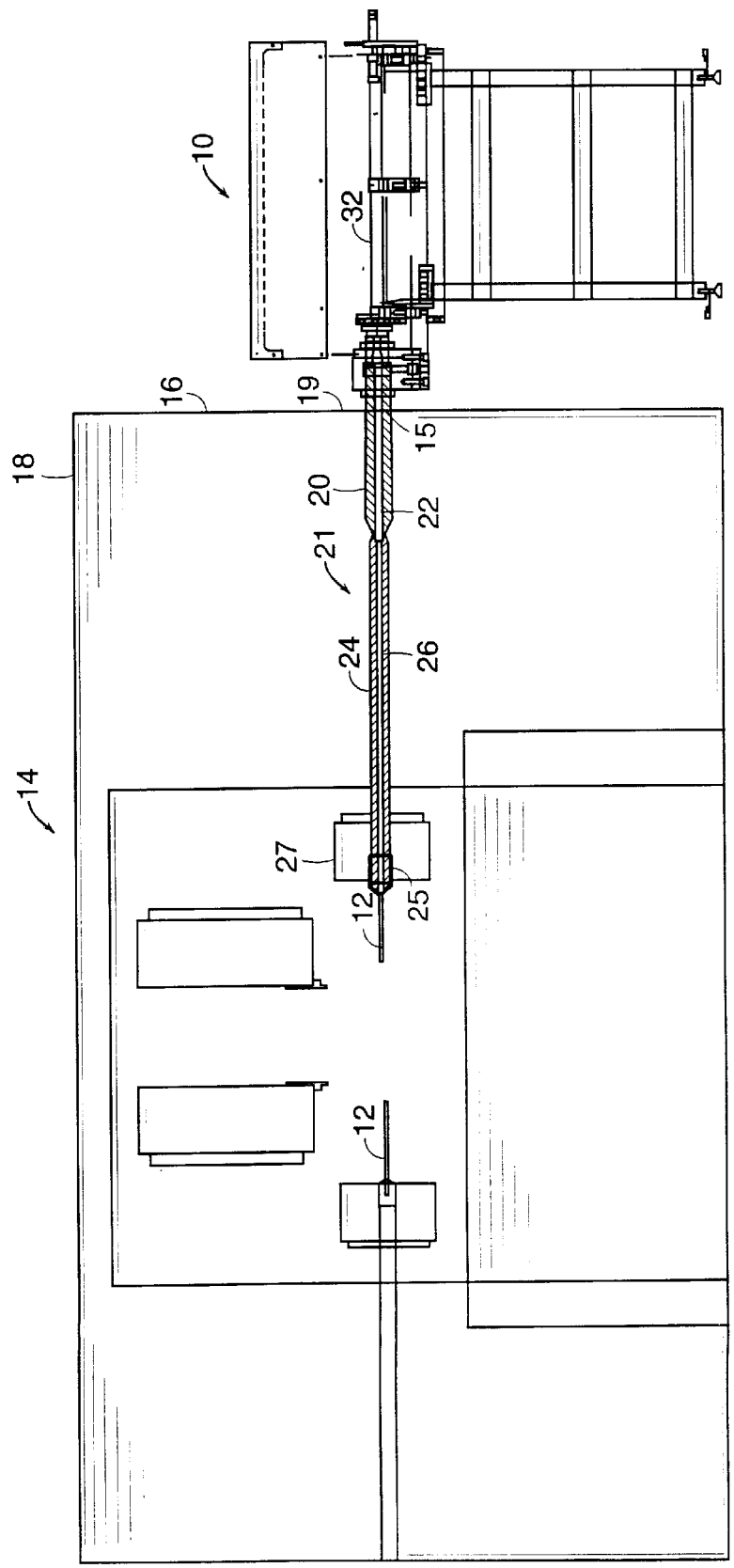
FIG. 1 is a partially cross-sectioned side view of the unloading device of the invention shown coupled to a twin spindle CNC lathe.

Referring to FIG. 1, an unloading device 10 for removing a workpiece 12 from a lathe 14, for example, a twin spindle CNC lathe, includes an unloading apparatus 21 including a first unloading member, for example, a lathe spindle liner 24, and a second unloading member 20. Lathe spindle liner 24 and unloading member 20 each have lengths of, for example, about thirty-two inches and outer diameters of, for example, about two inches, depending upon the lathe model being coupled to. Lathe spindle liner 24 is held by lathe collet 25 and unloading member 20 is positioned for coupling to lathe spindle liner 24.

Lathe spindle liner 24 moves with a lathe spindle 27 during machining of workpiece 12. Unloading member 20 includes a passage 22 extending therethrough which is aligned with a passage 26 in lathe spindle liner 24 when lathe spindle 27 is in its "home" position (as shown in FIG. 1). To provide access into lathe 14 for coupling of unloading member 20, lathe spindle liner 24, and spindle 27, a hole 15 is cut in a side 16 of lathe housing 18 in the area of a vent 19 (see FIG. 5).

Figure 2:
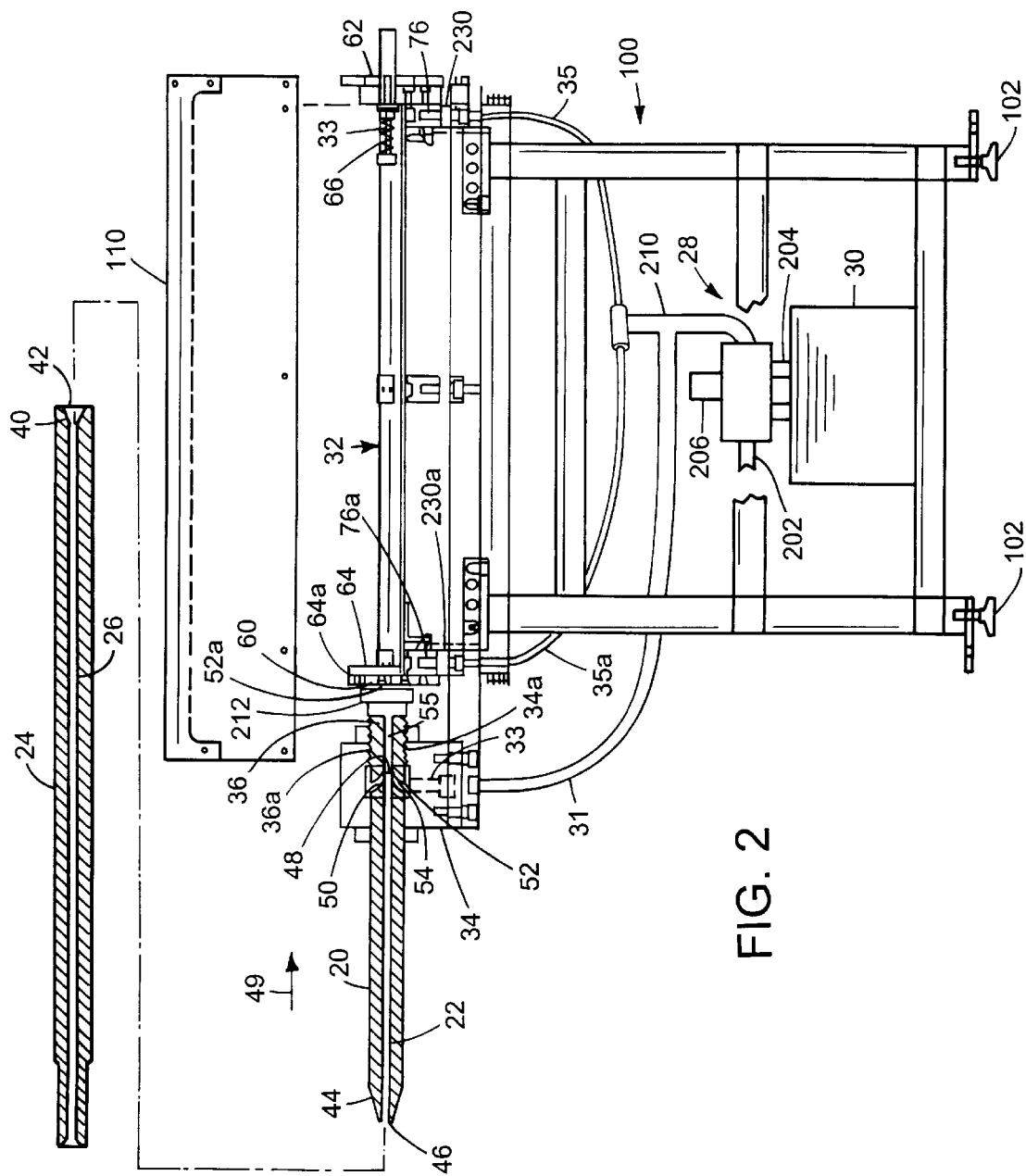
FIG. 2 is a partially cross-sectioned side view of the unloading device of FIG. 1.

Referring also to FIG. 2, a pneumatic system 28 is coupled to unloading member 20. Air flow from pneumatic system 28 acts on workpiece 12 through passages 22 and 26 when unloading member 20 is coupled to lathe spindle liner 24. With collet 25 open, the air flow causes workpiece 12 to travel into and through passages 26 and 22 to a tray 32.

Lathe spindle liner 24 includes an inner taper 40 at a downstream end 42 and unloading member 20 includes a corresponding outer taper 44 at an upstream end 46. With lathe spindle 27 in its "home" position, outer taper 44 fits within inner taper 40 such that air flow in passage 22 of unloading member 20 effects air flow in passage 26 of lathe spindle liner 24. Unloading member 20 and lathe spindle liner 24 are formed from, for example polyvinylchloride (PVC), to prevent damage to workpiece 12 as it travels down passages 22 and 26.

Figure 6:
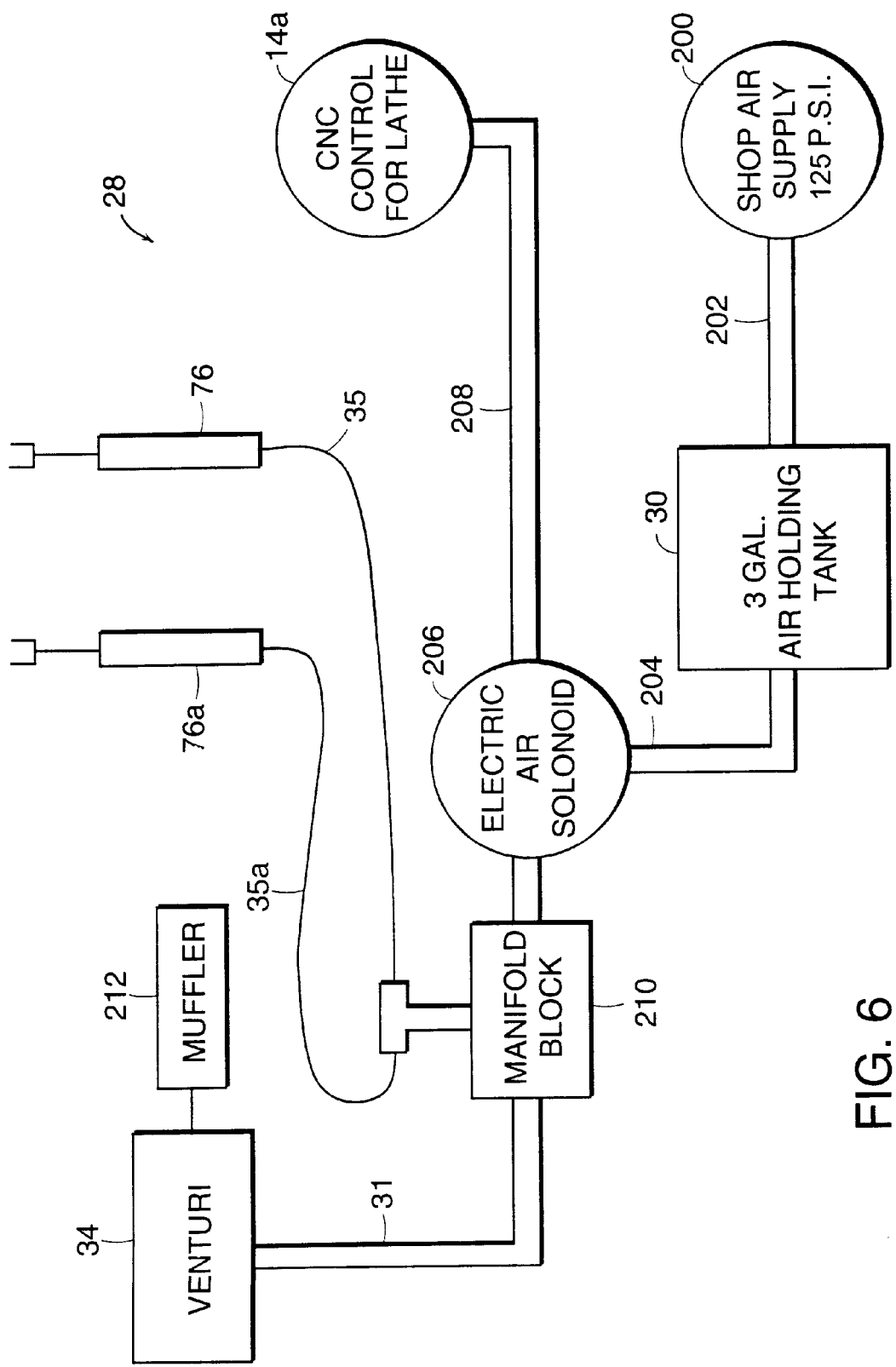
FIG. 6 is a schematic of the pneumatic system of the unloading device of FIG. 1.

Referring to FIGS. 2 and 6, pneumatic system 28 includes an air storage tank 30 which is connected to a source of air 200, for example, the standard air supply line of a machine shop, through a line 202. A line 204 runs from tank 30 to an electric air solenoid 206. An electric cable 208 runs from the lathe control 14a to solenoid 206 to control actuation of solenoid 206. From solenoid 206, air flows through a manifold block 210 and through a tube 31 to a passage 33 in a vacuum generator block 34, formed from, for example, PVC. A muffler 212, for example, a Vaccon, Medfield Mass., model VDF-750, is used as an air silencer. Tubing 35, 35a leads from manifold block 210 to a pair of air cylinders 76, 76a (described further below).

Block 34 supports unloading member 20 and a venturi coupler 36, formed from, for example, PVC. A downstream end 48 of unloading member 20 has an outer venturi taper 50, and an upstream end 52 of venturi coupler 36 has a corresponding inner venturi taper 54. Venturi coupler 36 also includes a passage 55 which receives workpiece 12 at upstream end 52 and feeds workpiece 12 to tray 32. Muffler 212 is attached to a downstream end 52a of venturi coupler 36 (see FIG. 2)

The air supply at a pressure of, for example, 125 psi, acting through 0.75 inch tubing 31, creates a flow of air that travels from tubing 31 into passage 33 in block 34 and through passage 55 in venturi coupler 36. The venturi tapers 50, 54 at the downstream end 48 of unloading member 20 and the upstream end 52 of venturi coupler 36 produce a flow of air in passage 22 of unloading member 20. The direction of air flow is from upstream end 46 to downstream end 48 (in the direction of arrow 49).

The force of the air flow is selected such that the force is high enough to cause workpiece 12 to travel through passages 26 and 22 into tray 32. Venturi coupler 36 is threaded at 36a and is received in threaded passage 34a of block 34 thus providing for adjustment of the position of venturi coupler 36 in block 34 such that the desired force of the air flow can be selected by changing the spacing between unloading member 20 and venturi coupler 36. The spacing between unloading member 20 and venturi coupler 36 can be selected such that a vacuum is created in passages 26 and 22. The air flow also acts to clean collet 25.

The clearance between workpiece 12 and unloading member 20, the clearance between workpiece 12 and spindle liner 24, as well as the spacing between unloading member 20 and venturi coupler 36, has an effect on whether a vacuum is created. To create a vacuum, unloading member 20, spindle liner 24, and venturi coupler 36 are sized to provide about 10 thousandths of an inch clearance between their inner diameters (the diameter of passages 22, 26 and 55) and the maximum outer diameter of workpiece 12.

Since venturi coupler 36 and unloading member 20 can create an air flow along passage 22 of unloading member 20, an unloading member having too much clearance between its inner diameter and the diameter of workpiece 12 can still act to unload a workpiece 12 that is not too heavy to be moved by the air flow provided. Unloading member 20 can be sized to unload workpieces having a diameter in the range of at least about 0.25 to 1.75 inches, and a length of up to at least 32 inches. Workpieces longer than 32 inches can be accommodated by increasing the lengths of unloading member 20 and tray 32.

Tray 32, which receives workpiece 12 as it exits venturi coupler 36, is supported on a frame 100 by tray mounts 60, 62. When workpiece 12 travels onto tray 32, it hits a damper 66, that is, a shock absorber, attached to mount 62 at the far end 33 of tray 32. Damper 66 absorbs the impact as the workpiece, which is generally traveling at speeds of about 8 ft/sec, hits the far end 33 of the tray. A trap door 64 attached to mount 60 closes when workpiece 12 enters tray 32 to prevent any possibility of the workpiece traveling back into the coupler after hitting damper 66. Trap door 64 includes a spring 64a. Workpiece 12 acts against spring 64a when traveling into tray 32 to open trap door 64. After passage of workpiece 12 through trap door 64, spring 64a acts to close trap door 64.

Figure 3:
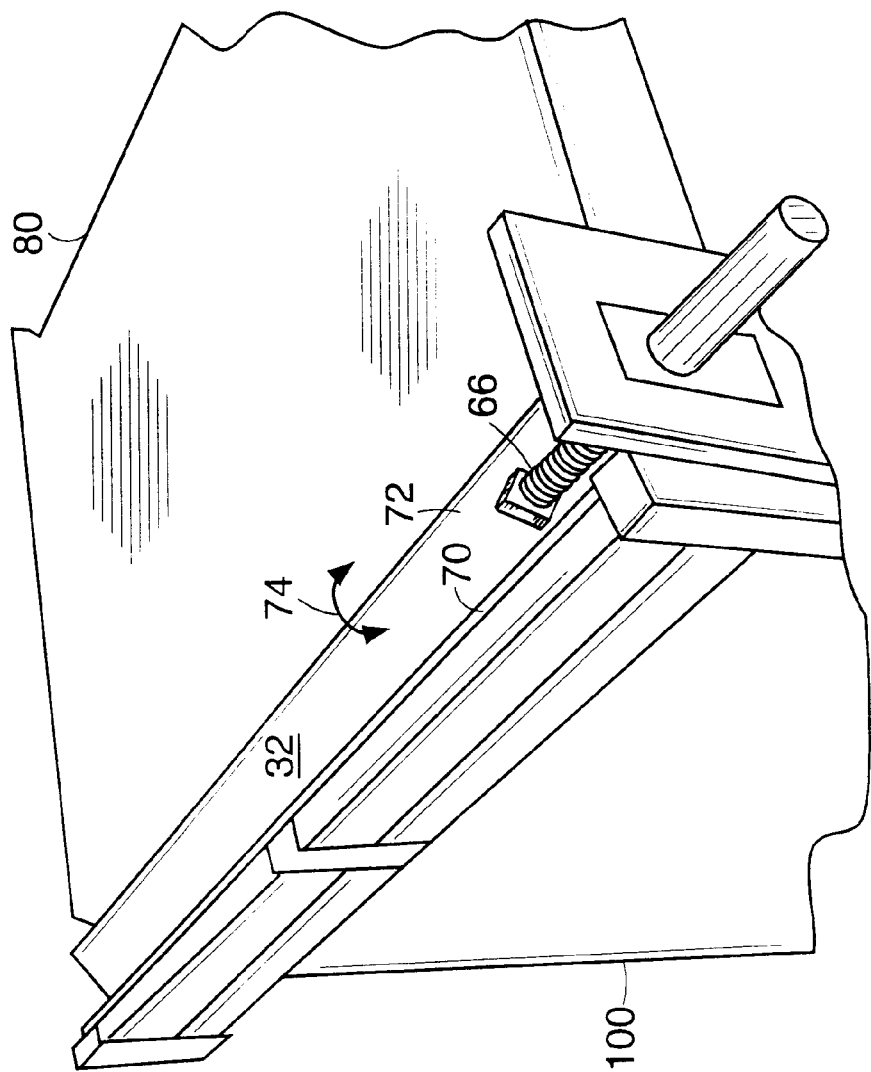
FIG. 3 is a perspective view of a workpiece receiving tray and table of the unloading device of FIG. 1.
Figure 4:
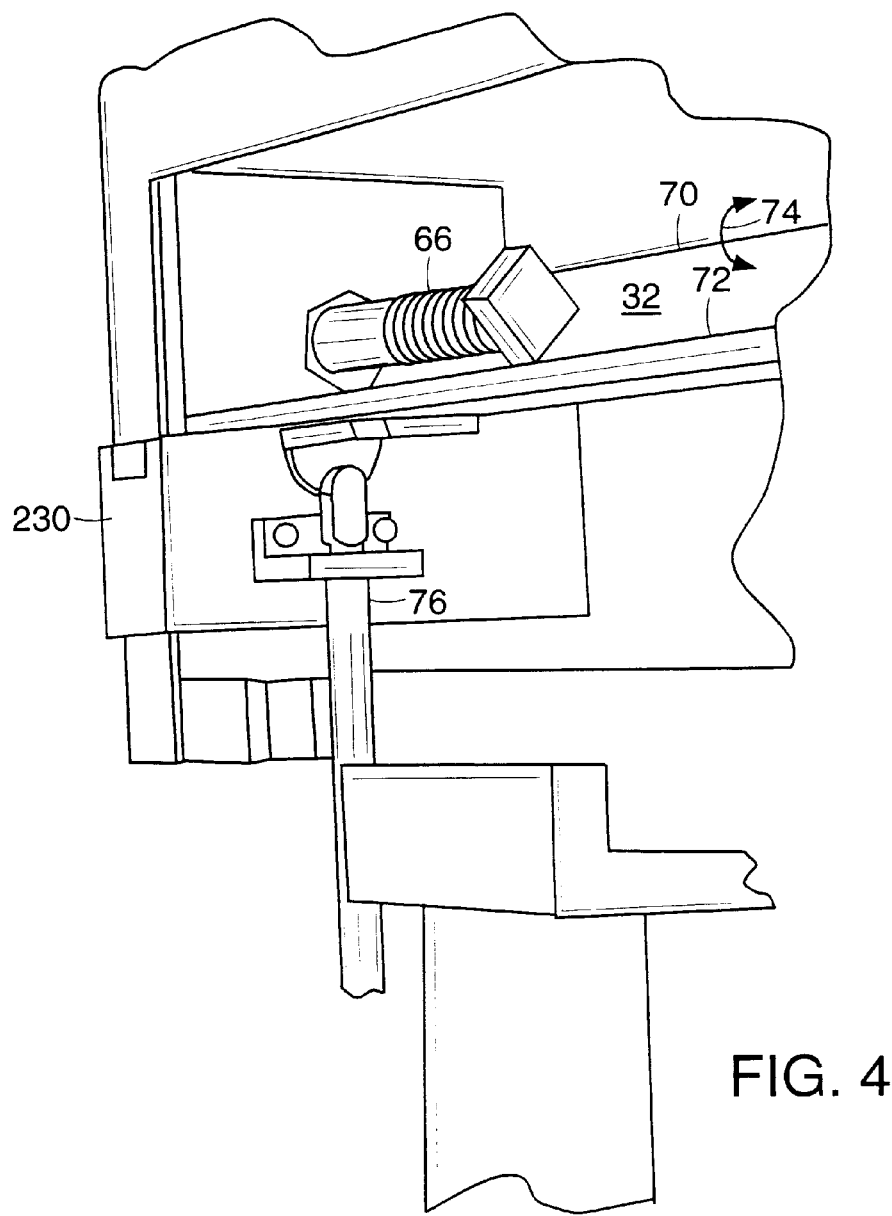
FIG. 4 shows a damper of the unloading device of FIG. 1.
Figure 4A:
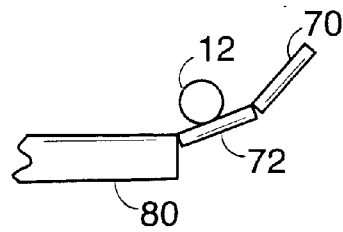
FIG. 4a is an end view of the workpiece receiving tray and table.

Referring to FIGS. 3 and 4, tray 32 is v-shaped and includes a stationary member 70 and a movable member 72. Movable member 72 can be rotated in the direction of an arrow 74 using pneumatic cylinders 76, 76a (FIG. 2). When air solenoid 206 is activated to allow flow to manifold block 210 (during unloading of workpiece 12), cylinders 76, 76a lift movable member 72 to its upward position, forming the v-shape of tray 32. When there is no air flow to cylinders 76, 76a, cylinders 76, 76a lower and movable member 72 is positioned to slope downward (as shown in FIGS. 4 and 4a) such that workpiece 12 rolls out of tray 32 and onto a storage table 80 supported by frame 100.

To accommodate different diameter workpieces 12, the height of v-shaped tray 32 can be adjusted. A pair of replaceable spacer blocks 230, 230a (see also FIG. 2) is provided underneath tray 32. The height of spacer blocks 230, 230a determines the height of tray 32.

Figure 5A:
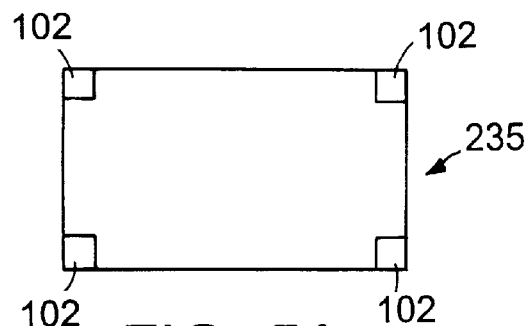
FIG. 5A shows the footprint of the unloading device.
Figure 5:
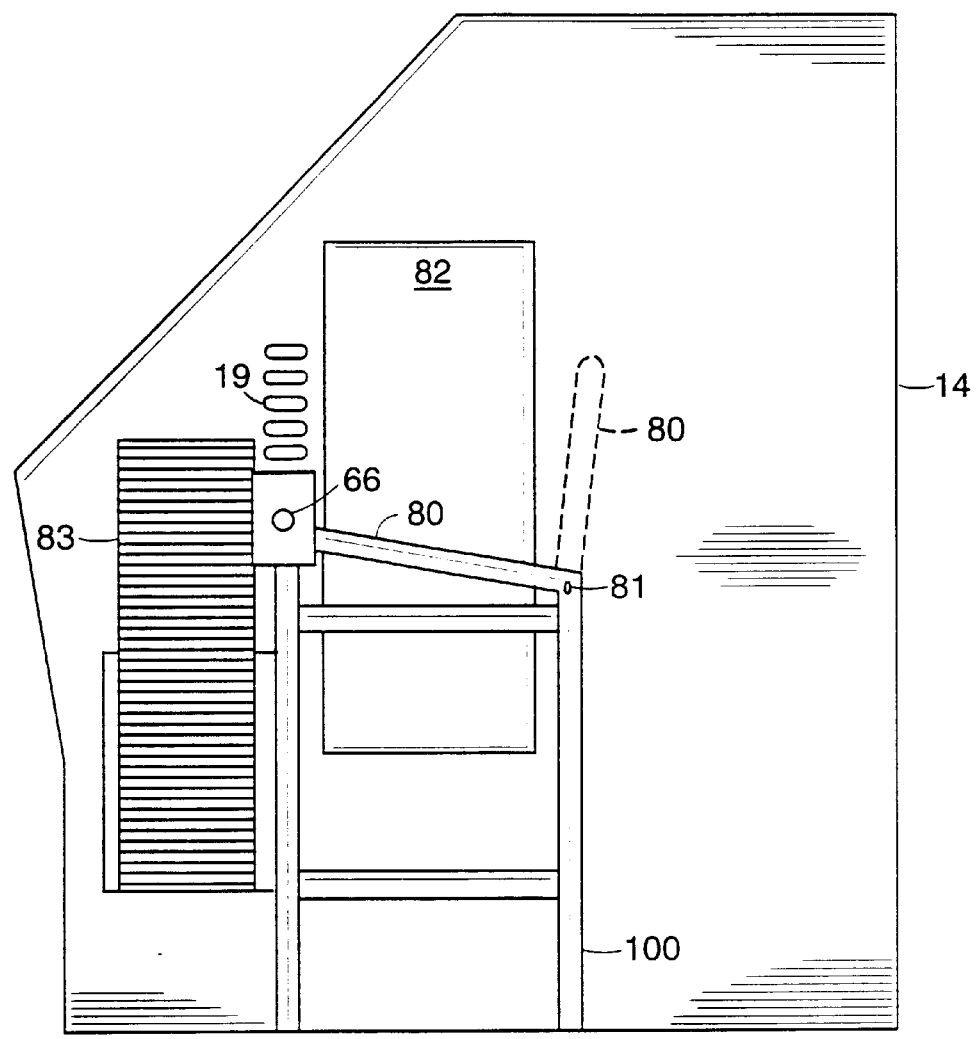
FIG. 5 shows the unloading device of FIG. 1 in position to allow access to a door of the twin spindle CNC lathe.

Referring to FIG. 5, table 80 can be rotated about a pivot axis 81 in order to lift table 80 out of the way (in the position of table 80 shown in broken line) to permit access to lathe door 82. The small footprint 235 (FIG. 5A), for example, 43 inches by 31 inches, of unloading device 10 enables use of unloading device 10 with a chip conveyor 83.

Referring again to FIG. 2, frame 100 includes leveling feet 102 for use when aligning unloading member 20 with spindle liner 24. A cover 110 attaches to block 34, mount 62, and frame 100 to protect the user from contact with workpieces traveling onto tray 32.

Pneumatic system 28 includes pneumatic valves for controlling air flow to block 34 and pneumatic cylinder 76, respectively. The valves are electrically connected to CNC lathe 14 and CNC lathe 14 is programmed to control the valves to coordinate the flow of air to block 34 and pneumatic cylinder 76 with the machining of workpiece 12. The airflow to block 34 is turned on for a predetermined dwell time dependent on the size of workpiece 12; for most workpieces, dwell times of about 1 second are selected.

In use, after machining of workpiece 12 and with spindle 27 in its "home" position, air is supplied to vacuum generator block 34 through tubing 31 to create the actuating air flow in unloading member 20. Collet 25 is then opened, workpiece 12 travels through spindle liner 24 and unloading member 20 and onto tray 32. Workpiece 12 travels along tray 32 and hits damper 66, movable member 72 of tray 32 is then lowered and workpiece 12 rolls onto table 80. Workpiece 12 is unloaded from spindle 27 in less than one second. Since the air flow is directed through trap door 64, air flow alone is often enough to unload workpiece 12 without the need for creating a vacuum in unloading member 20 and spindle liner 24.

Figure 7:
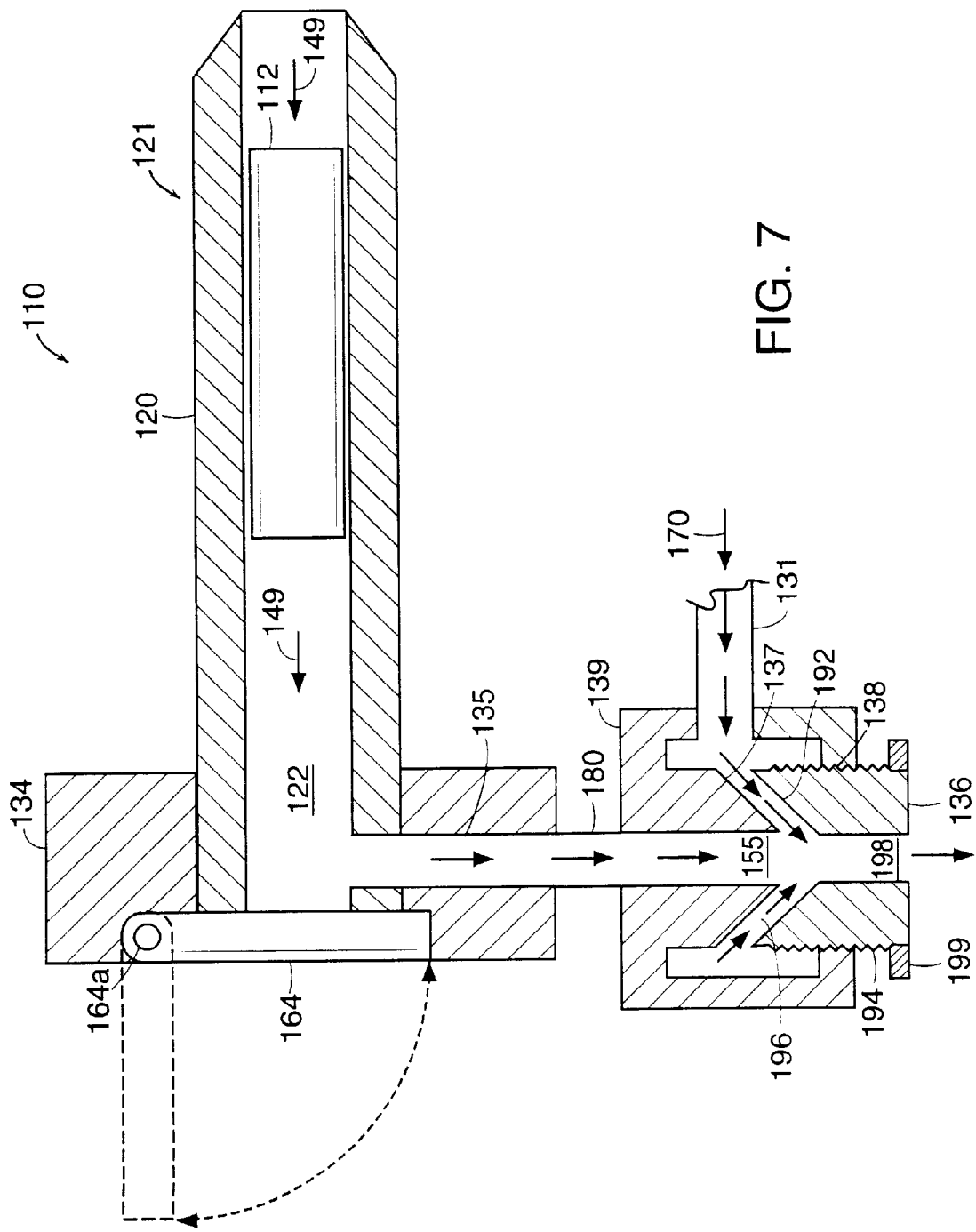
FIG. 7 shows an alternative embodiment of an unloading device according to the invention.

In a preferred embodiment, referring to FIG. 7, an unloading device 110 designed to create a vacuum in an unloading apparatus 121 includes a block 134 supporting an unloading member 120. Unloading member 120 is coupled to spindle liner 24 as described above with reference to FIG. 2. Block 134 has a passage 135 communicating with a passage 122 in unloading member 120, and communicating with a passage 155 in a venturi block 139 at a downstream end of unloading apparatus 121 through a hose 180. Venturi block 139 has a venturi taper 137, which, in conjunction with an end coupler 136 having a venturi taper 192, creates a venturi effect in passage 155. Venturi block 139 has a threaded section 138 and end coupler 136 has a threaded section 194 to permit adjustment of the size of channel 196. A muffler 199 is attached to end block 190.

Unloading member 120 is particular useful when unloading large diameter, heavy workpieces 112 from lathe 14, that is workpieces that are generally too heavy to be moved by air flow alone, and when higher unloading speeds are desired. The clearance between the inner diameter of unloading member 120 and the largest outer diameter of workpiece 112 should be no greater than about 10 thousandths of an inch.

In use, air flow along the direction of arrow 170 through a tube 131 from an air supply (not shown) enters venturi block 139. A venturi effect is created which forms a vacuum in passages 155, 135 and 122. The vacuum acts to move the workpiece from the lathe spindle and through unloading member 120, along the direction of arrow 149. Air is exhausted through passage 198 in end coupler 136. Workpiece 112 engages trap door 164 causing trap door 164 to open (shown in broken line) and travels out of unloading member 120 and onto tray 32, as described above in connection with FIGS. 2–4.

Additions, subtractions and other modifications of the illustrated embodiments of the invention will be apparent to those practiced in the art and are within the scope of the following claims.

What is claimed is:

1. An unloading device for removing a workpiece from a twin-spindle CNC lathe having a housing, a pair of spindles and a pair of chucks for holding said workpiece, comprising:

an unloading apparatus for receiving said workpiece, said unloading apparatus configured to extend into a machining chamber defined inside the lathe housing for coupling to said spindle while permitting removal of said workpiece from said unloading apparatus without decoupling of said unloading apparatus from said spindle, and a pneumatic system coupled to said unloading apparatus whereby an air flow created by said pneumatic system acts on said workpiece when said unloading apparatus is coupled to said spindle and causes the workpiece to exit said spindle and travel to said unloading apparatus.

2. The unloading device of claim 1 wherein said unloading apparatus includes a first unloading member for receiving said workpiece, said first member being configured to extend into said machining chamber for coupling to said spindle, and a second unloading member for receiving said workpiece, said second unloading member being configured to couple to said first unloading member, said pneumatic system being coupled to said second unloading member whereby the air flow created by said pneumatic system acts on said workpiece when said second unloading member is coupled to said first unloading member and causes the workpiece to exit the spindle and travel to said first and said second unloading members.

3. The unloading device of claim 2 wherein said first and said second unloading members each includes a passage therethrough for receiving said workpiece.

4. The unloading device of claim 2 wherein said second unloading member includes an upstream end for axial coupling to a downstream end of said first unloading member.

5. The unloading device of claim 4 wherein said upstream end of said second unloading member includes an outer taper and said downstream end of said first unloading member includes an inner taper.

6. An unloading device for removing a workpiece from a lathe having a spindle for holding said workpiece, comprising:

an unloading apparatus for receiving said workpiece, said unloading apparatus configured to extend into a machining chamber for coupling to said spindle, and a pneumatic system coupled to said unloading apparatus whereby an air flow created by said pneumatic system acts on said workpiece when said unloading apparatus is coupled to said spindle and causes the workpiece to exit said spindle and travel to said unloading apparatus, said unloading apparatus includes a downstream end configured to create a venturi effect when said air flow is created at said downstream end of said unloading apparatus.

7. The unloading device of claim 6 further including a coupler configured to interact with said downstream end of said unloading apparatus to create said venturi effect.

8. The unloading device of claim 7 wherein said coupler is adjustable to control the air flow acting on said workpiece.

9. An unloading device for removing a workpiece from a lathe having a spindle for holding said workpiece, comprising:

an unloading apparatus for receiving said workpiece, said unloading apparatus configured to extend into a machining chamber for coupling to said spindle, said unloading apparatus including a first unloading member for receiving said workpiece, said first member being configured to extend into said machining chamber for coupling to said spindle, and a second unloading member for receiving said workpiece, said second unloading member being configured to couple to said first unloading member, and a pneumatic system coupled to said second unloading member whereby an air flow created by said pneumatic system acts on said workpiece when said second unloading member is coupled to said first unloading member and causes said workpiece to exit said spindle and travel to said first and said second unloading members, said unloading apparatus further includes a venturi block coupled to a downstream end of said second unloading member, said venturi block configured to create a venturi effect when said air flow is created at said downstream end of said unloading apparatus.

10. The unloading device of claim 9 further including a coupler configured to interact with said downstream end of said unloading apparatus to create said venturi effect.

11. The unloading device of claim 10 wherein said coupler is adjustable to control the air flow acting on said workpiece.

12. The unloading device of claim 1 further including a workpiece receiving tray located downstream of said unloading apparatus.

13. The unloading device of claim 12 wherein said workpiece receiving tray is v-shaped.

14. An unloading device for removing a workpiece from a lathe having a spindle for holding said workpiece, comprising:

an unloading apparatus for receiving said workpiece, said unloading apparatus configured to extend into a machining chamber for coupling to said spindle, a pneumatic system coupled to said unloading apparatus whereby an air flow created by said pneumatic system acts on said workpiece when said unloading apparatus is coupled to said spindle and causes the workpiece to exit said spindle and travel to said unloading apparatus, and a workpiece receiving tray located downstream of said unloading apparatus, said workpiece receiving tray includes two members coacting to form a v-shaped receiving tray, one of said members being adjustable to change an included angle between said two members.

15. The unloading device of claim 14 further including a holding table which receives said workpiece from said tray.

16. The unloading device of claim 1 further including a damper located downstream of said unloading apparatus against which said workpiece is directed after exiting said unloading apparatus.

17. An unloading device for removing a workpiece from a lathe having a spindle for holding said workpiece, comprising:

an unloading apparatus for receiving said workpiece, said unloading apparatus configured to extend into a machining chamber for coupling to said spindle, a pneumatic system coupled to said unloading apparatus whereby an air flow created by said pneumatic system acts on said workpiece when said unloading apparatus is coupled to said spindle and causes the workpiece to exit said spindle and travel to said unloading apparatus, a damper located downstream of said unloading apparatus against which said workpiece is directed after exiting said unloading apparatus, and a safety door located between said unloading apparatus and said damper.

18. An unloading device for removing a workpiece from a lathe having a spindle for holding said workpiece, comprising:

a first unloading member including a passage therethrough for receiving said workpiece, said first unloading member having an upstream end configured to axially couple to said spindle, a second unloading member including a passage therethrough for receiving said workpiece, said second unloading member having an upstream end configured to axially couple to a downstream end of said first unloading member, and said second unloading member having a downstream end configured to create a venturi effect when air flows by said downstream end of said second unloading member, a coupler configured to interact with said downstream end of said second unloading member to create said venturi effect, a workpiece receiving tray located downstream of said second unloading member and including a damper against which said workpiece is directed after exiting said second unloading member, and a pneumatic system coupled to said second unloading member whereby a venturi effect created by said second unloading member and said coupler acts on said workpiece when said second unloading member is coupled to said first unloading member and causes the workpiece to exit the lathe spindle and travel through said passages in said first unloading member and said second unloading member.

19. An unloading device for removing a workpiece from a lathe having a spindle for holding said workpiece, comprising:

an unloading apparatus for receiving said workpiece, said unloading apparatus configured to couple to said spindle, and a pneumatic system coupled to said unloading apparatus whereby an air flow created by said pneumatic system acts on said workpiece when said unloading apparatus is coupled to said spindle and causes the workpiece to exit the lathe spindle and travel to said unloading apparatus, said unloading apparatus including a downstream end configured to create a venturi effect when said air flow is created at said downstream end.

20. The unloading device of claim 19 further including a coupler configured to interact with said downstream end of said unloading apparatus to create said venturi effect.

21. The unloading device of claim 20 wherein said coupler is adjustable to control the air flow acting on said workpiece.

22. An unloading device for removing a workpiece from a lathe having a spindle for holding said workpiece, comprising:

an unloading apparatus for receiving said workpiece, said unloading apparatus being configured to couple to said spindle, said unloading apparatus including a first unloading member for receiving said workpiece and a second unloading member for receiving said workpiece, said second unloading member configured to couple to said first unloading member, a pneumatic system coupled to said unloading apparatus whereby an air flow created by said pneumatic system acts on said workpiece when said unloading apparatus is coupled to said spindle and causes the workpiece to exit said spindle and travel to said unloading apparatus, and a workpiece receiving tray located downstream of and substantially axially aligned with said second unloading member.

23. The unloading device of claim 22 wherein said workpiece receiving tray is v-shaped.

24. An unloading device for removing a workpiece from a lathe having a spindle for holding said workpiece, comprising:

an unloading apparatus for receiving said workpiece, said unloading apparatus being configured to couple to said spindle, a pneumatic system coupled to said unloading apparatus whereby an air flow created by said pneumatic system acts on said workpiece when said unloading apparatus is coupled to said spindle and causes the workpiece to exit said spindle and travel to said unloading apparatus, and a workpiece receiving tray located downstream of said unloading apparatus, said workpiece receiving tray includes two members coacting to form a v-shaped receiving tray, one of said members being adjustable to change an included angle between said two members.

25. The unloading device of claim 24 further including a holding table which receives said workpiece from said tray.

26. The unloading device of claim 25 wherein the holding table is pivotable to permit accesss to a lathe door.

27. An unloading device for removing a workpiece from a lathe having a spindle for holding said workpiece, comprising:

an unloading apparatus for receiving said workpiece, said unloading apparatus being configured to couple to said spindle, a pneumatic system coupled to said unloading apparatus whereby an air flow created by said pneumatic system acts on said workpiece when said unloading apparatus is coupled to said spindle and causes the workpiece to exit the spindle and travel to said unloading apparatus, a damper located downstream of said unloading apparatus against which said workpiece is directed after exiting said unloading apparatus, and a safety door located between said unloading apparatus and said damper.

28. A method of removing a workpiece from a lathe having a spindle for holding said workpiece, comprising the steps of:

creating an air flow in an unloading apparatus coupled to said spindle, whereby a venturi effect is created such that said air flow acts on said workpiece when said unloading apparatus is coupled to said spindle and causes the workpiece to exit the spindle and travel to said unloading apparatus.

\* \* \* \* \*